United States Patent

Shibata et al.

[11] Patent Number: 5,206,056
[45] Date of Patent: Apr. 27, 1993

[54] METHOD OF APPLICATION AND DEVICE FOR APPLICATION

[75] Inventors: Norio Shibata; Naoyoshi Chino, both of Kanagawa, Japan

[73] Assignee: Fuji Photo Film Co., Ltd., Kanagawa, Japan

[21] Appl. No.: 770,005

[22] Filed: Oct. 2, 1991

[30] Foreign Application Priority Data

Oct. 8, 1990 [JP] Japan ................ 2-268533

[51] Int. Cl.$^5$ ............ B05D 1/26; B05C 5/00
[52] U.S. Cl. ................ 427/356; 118/410; 118/419
[58] Field of Search ........... 118/410, 419; 427/356, 427/357, 358

[56] References Cited

U.S. PATENT DOCUMENTS

| | | | |
|---|---|---|---|
| 4,748,057 | 5/1988 | Kageyama et al. | 118/410 X |
| 4,854,262 | 8/1989 | Chino et al. | 427/356 X |
| 4,907,530 | 3/1990 | Shibata et al. | 118/410 |
| 5,042,422 | 8/1991 | Tobisawa et al. | 118/410 |

Primary Examiner—W. Gary Jones
Assistant Examiner—Charles K. Friedman
Attorney, Agent, or Firm—Sughrue, Mion, Zinn, Macpeak & Seas

[57] ABSTRACT

An application device capable of very rapidly applying a liquid in the form of a thin film to a continuously moving flexible carrier in such a manner as to avoid corrosion and wear to the surface of the doctor edge portion of the application device to thus avoid the formation of streaks on the surface of the applied liquid. A clearance between the surface of the carrier and the surface of the doctor edge portion is made larger at the downstream end of the surface of the doctor edge portion than at the upstream part thereof. For this purpose, a support roller is provided near the downstream end of the surface of the doctor edge portion so that the clearance between the surface of the doctor edge portion and the surface of the carrier can be appropriately controlled along substantially the entire width of the doctor edge portion by adjustably displacing the roller. Application is performed while the clearance between the surface of the carrier and the doctor edge portion is set larger at the downstream end of the surface of the doctor edge portion than at the upstream part of the surface thereof.

5 Claims, 2 Drawing Sheets

METHOD OF APPLICATION AND DEVICE FOR APPLICATION

BACKGROUND OF THE INVENTION

The present invention relates to a device for applying a coating liquid to the surface of a moving carrier, and more particularly to an improved device for applying a coating liquid to the surface of a moving carrier through the use of the surface of a doctor edge portion of the application device.

Various conventional devices are known for applying a magnetic liquid or a photographic photoconductive liquid to a moving web. In one of these devices, the liquid is applied to a flexible carrier while the carrier is pinched between the application surface of the device and the carrier. Examples of such devices include an extrusion-type application device, a gravure-smoother-type application device and a doctor-type application device.

The flexible carrier referred to herein can be a flexible sheet or web such as a plastic film, paper, polyolefin-coated paper, or a sheet of a metal such as aluminum and copper. A liquid such as a magnetic liquid, photographic photosensitive liquid, or various other liquids is applied to the carrier to manufacture a magnetic recording material, a photographic film, printing paper or the like.

For example, the application device can be an extrusion-type application device having a doctor edge portion, such devices typically being used for applying a magnetic dispersion liquid. Examples of such a device, which is widely used for applying magnetic dispersion liquids, are described in the Japanese Unexamined Published Patent Applications Nos. 138036/75 and 84771/80 and the Japanese Patent Application No. 7306/79.

As depicted in FIG. 6, the clearance t between the surface 5a of the doctor edge portion 5 of such an extrusion-type application device and a flexible carrier W is generally set to decrease toward the downstream end A of the surface 5a of the doctor edge portion so that the clearance is a minimum value at the downstream end. As a result, the carrier W is moved at an appropriate angle over the surface 5a of the doctor edge portion 5 so that the pressure of the liquid F is made appropriate as the liquid is applied to the carrier. Since the clearance t is a minimum at the downstream end A of the surface 5a of the doctor edge portion 5, the shearing stress of the liquid F is made to concentrate at the downstream end, exerting strong force against the surface 5a of the doctor edge portion 5.

Since the magnetic dispersion liquid contains materials such as a magnetic substance, an abrasive and a lubricant, which all have a tendency to corrode or wear metals, the surface 5a of the doctor edge portion 5 of the extrusion-type application device deteriorates more rapidly at the downstream end A of the surface than at other parts of the surface. The resulting nonuniformity in the surface 5a leads to problems such as streaking of the liquid applied to the carrier W. Streaks in the manufactured recording media cause various problems, such as a deteriorated S/N or C/N ratio. For the above reasons, the doctor edge portion must often be replaced or reprocessed. The problem is more serious when the liquid is applied as a thin film or applied at a high rate.

SUMMARY OF THE INVENTION

The present invention was made in order to solve the problems mentioned above. Accordingly, it is an object of the invention to provide a device capable of very rapidly applying a liquid in the form of a thin film in such a manner as to avoid corrosion and wear to the surface of the doctor edge portion of the application device to thus avoid the formation of streaks on the surface of the applied liquid.

The problems mentioned above can be solved by a method and a device for continuously applying a liquid to the surface of a continuously moving flexible carrier through the use of the surface of a doctor edge portion facing the surface of the carrier, which method is characterized in that the clearance between the surface of the carrier and the surface of the doctor edge portion is made larger at the downstream end of the surface of the doctor edge portion than at the upstream part thereof. The device is characterized in that a support roller is provided near the downstream end of the surface of the doctor edge portion so that the clearance between the surface the doctor edge portion and the surface of the carrier can be appropriately controlled along nearly the entire width of the doctor edge portion by displacing the roller, such that application of the coating liquid is performed while the clearance between the surface of the carrier and the doctor edge portion is set larger at the downstream end of the surface of the doctor edge portion than at the upstream part of the surface thereof.

DESCRIPTION OF THE PREFERRED EMBODIMENTS

Preferred embodiments of the present invention are hereafter described in detail with reference to the attached drawings.

Figure 1:
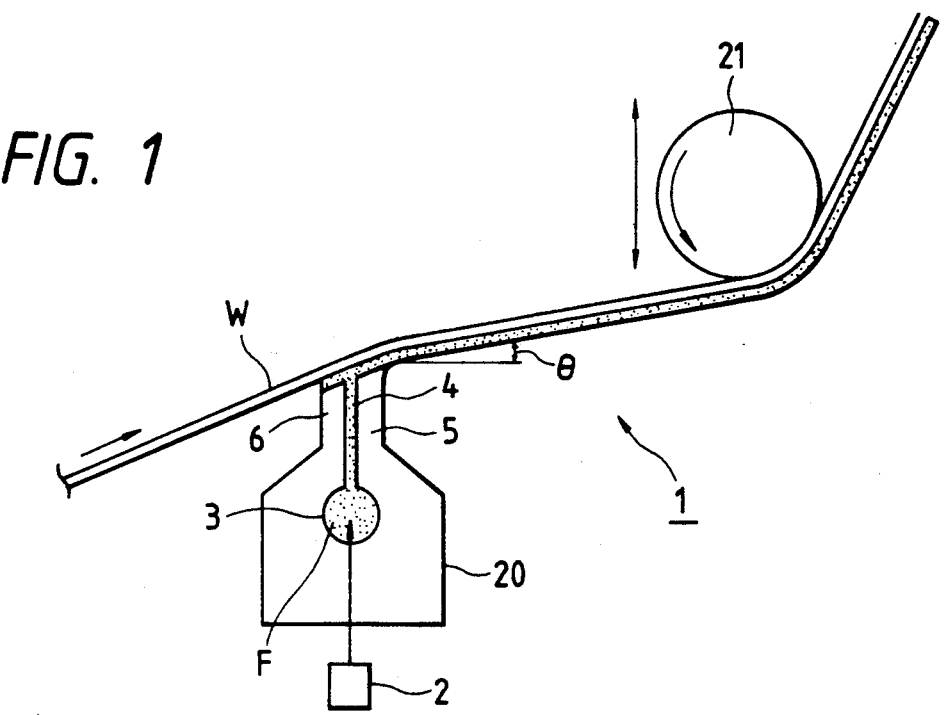
FIG. 1 is a sectional view of an application device constructed in accordance with a preferred embodiment of the present invention.
Figure 2:
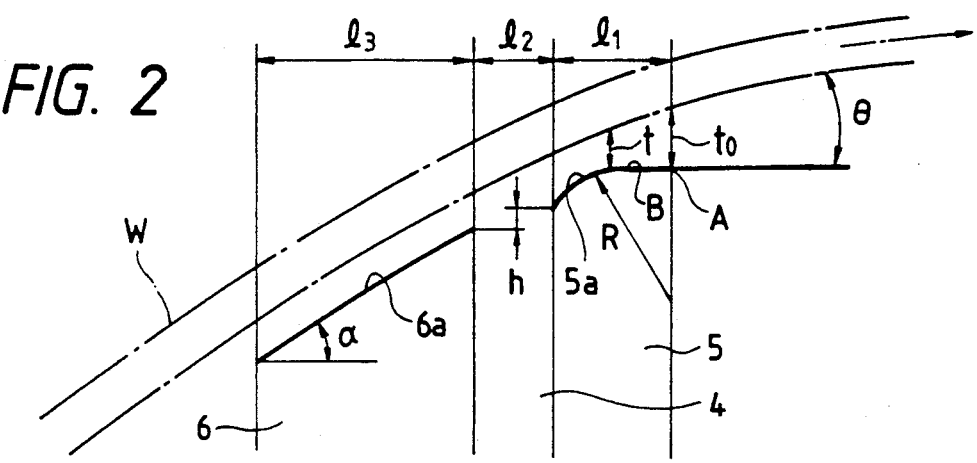
FIG. 2 is a sectional view of the extrusion-type application head of the application device of FIG. 1.

FIG. 1 is a sectional view of an extrusion-type application device 1 which has a doctor edge portion 5. FIG. 1 shows the device 1 in the state where it is set to apply a liquid F to a carrier W. FIG. 2 is a sectional view of the application head 20 of the device 1.

The application head 20 has a pocket 3, a slot 4, the doctor edge portion 5, and a back edge portion 6. The liquid feed line 2 of the device 1 includes a constant-flow-rate liquid feed pump provided outside the body of the head 20 and capable of continuously feeding the liquid F at a constant rate to the pocket 3, and a pipe extending into the body of the head to connect the pump to the pocket. (The pump is not shown in the drawings.)

Figure 3:
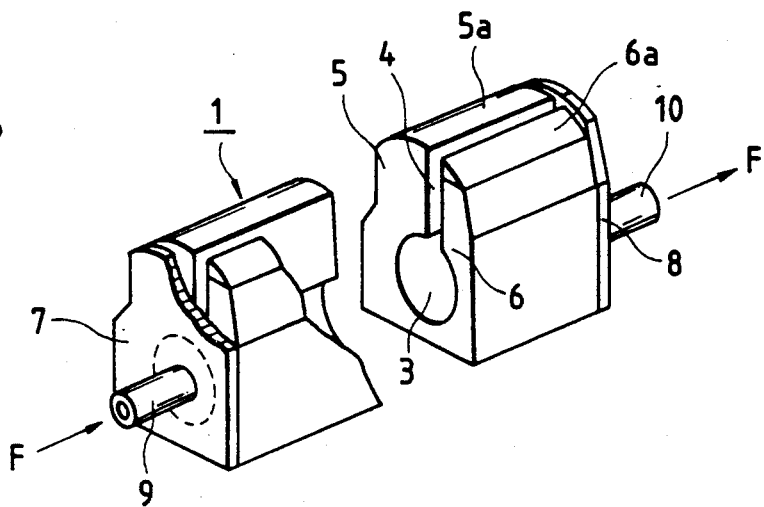
FIG. 3 is a cutaway perspective view of the coating head of the application device.

The pocket 3 is a liquid reservoir extending in the body of the head 20 in the longitudinal direction thereof along with the width of the carrier W. The cross section of the pocket 3 is substantially circular along the entire width of the carrier W. The effective length of the pocket 3 is equal to or greater than the width of the layer of the liquid F applied to the carrier W. Both ends of the pocket 3 are closed with seal plates 7 and 8 attached to the head 20, as shown in FIG. 3.

A short pipe 9 projects from the seal plate 7 and is connected to the liquid feed line 2 to introduce the liquid F into the pocket 3. Another short pipe 10 projects from the other seal plate 8 so that a portion of the liquid F introduced into the socket 3 through the former short pipe 9 is drained through the latter short pipe 10. The liquid F is thus prevented from remaining in the pocket 3 for excessive periods. This draining arrangement is very effective, particularly if the liquid F is a magnetic liquid having thixotropy and which is thus likely to cohere. However, the short pipe 10 can be omitted if desired.

The slot 4 is a relatively narrow passage extending in the body of the application head 20 from the pocket 3 toward the carrier W and from one end of the head toward the other end thereof as well as the pocket 3. The width of the slot 4 is generally 0.03 to 2 mm. The length of the slot 4 along the width of the carrier W is substantially the same as that of the layer of the liquid F applied to the carrier. The depth of the slot 4 can be appropriately set in consideration of various conditions such as the composition, physical properties, flow rate, and pressure of the liquid F. What is required as to the depth of the slot 4 is that the liquid F laminarly flow out of the pocket 3 with a uniform flow rate and with a uniform distribution of pressure along the total width of the carrier W.

The angle $\theta$ of the carrier W over the head 20 can be modulated by a guide roller 21 provided downstream of the head. The head 20 is supported near the carrier W by an application head support mechanism (not shown in the drawings) so that the carrier is curved substantially parallel with the surfaces 5a and 6a of the doctor edge portions 5 and back edge portion 6 of the head, while the carrier is supported with substantially constant tension between the guide roller 21 and another guide roller (not shown) so as to be slightly curved in the direction of thickness of the carrier, as shown in FIG. 1.

When the liquid F is fed at a desired flow rate to the head 20 through the liquid feed line 2, the liquid flows through the pocket 3 and the slot 4 and is pushed out from the outlet portion of the slot at a uniform flow rate and with a uniform distribution of pressure along the width of the carrier W because the surfaces 5a and 6a of the doctor edge portion 5 and the back edge portion 6 act to retain the liquid and the carrier acts to push the liquid downward. The liquid F flowing out from the outlet portion of the slot 4 moves onto the surface of the carrier W continuously moving in a direction X while a small clearance is maintained between the surface of the carrier and the surfaces of the edge portions 5 and 6. At this time, the liquid F acts to increase the clearance between the surface 5a of the doctor edge portion 5 and the surface of the carrier W. The pressure of the liquid F is high, particularly between the surface 5a of the doctor edge portion 5 and that of carrier W. So long as the flow of the liquid F is continuous, the entire surface 5a of the doctor edge portion 5 and the surface of the carrier W are completely separated from each other by a prescribed clearance by the liquid moving in the form of a thin layer along the entire width of the carrier.

Figure 4:
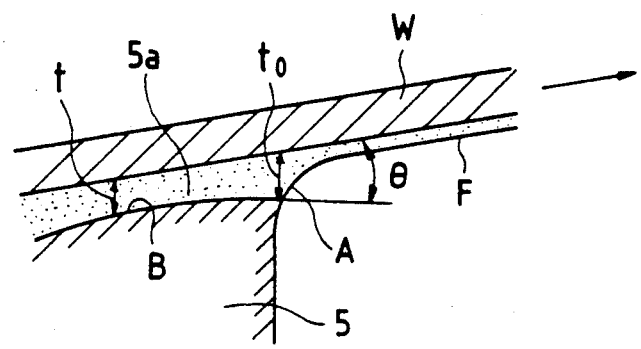
FIGS. 4 and 5 illustrate states of application at the downstream end of the surface of the doctor edge portion of the head.

The clearance between the surface 5a of the doctor edge portion 5 and the surface of the carrier W is set to increase from the middle of the surface of the doctor edge portion toward the downstream end A of the surface, as shown in FIG. 4. The clearance has a value $t_0$ at the downstream end A. Setting the clearance in this way can be easily performed by displacing the support roller 21 up or down. The radius of curvature of the upstream part of the surface 5a of the doctor edge portion 5 can be appropriately set to make the pressure of the liquid F appropriate for applying it to the carrier W. Since the liquid F is applied to the carrier W in this manner, the shearing stress $\tau$ of the liquid is made lower at the downstream end A of the surface 5a of the doctor edge portion 5 than at the intermediate point B of the surface. This can be easily understood through consideration of the following formula:

$$\tau = \mu \cdot \gamma = \mu \cdot V_{web}/t$$

In this formula, $\tau$, $\mu$, $\gamma$, $V_{web}$ and t denote the shearing stress, the viscosity of the liquid F, the shearing velocity thereof, the speed of the carrier W, and the clearance, respectively. It is understood from the formula that the shearing stress $\tau$ of the liquid F is decreased by increasing the clearance t. Therefore, if the value $t_0$ of the clearance at the downstream end A of the surface 5a of the doctor edge portion 5 is not the minimum, the shearing stress of the liquid F does not concentrate at the downstream end, so that the end is not heavily loaded due to the pressure of the liquid. The surface 5a can thus be prevented from being deteriorated at the downstream end A thereof by materials such as a magnetic substance, abrasive or lubricant contained in the liquid F. As a result, streaks or the like are prevented from being formed on the layer of the applied liquid F on the carrier W since deterioration of the surface 5a of the doctor edge portion 5 at the downstream end A of the surface is prevented.

Figure 5:
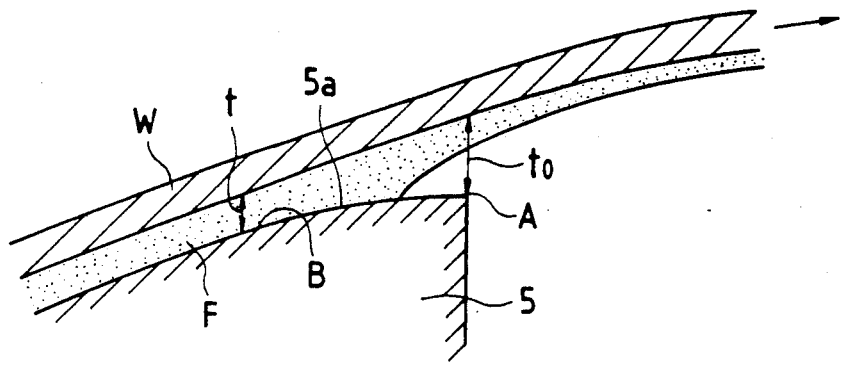
Figure 6:
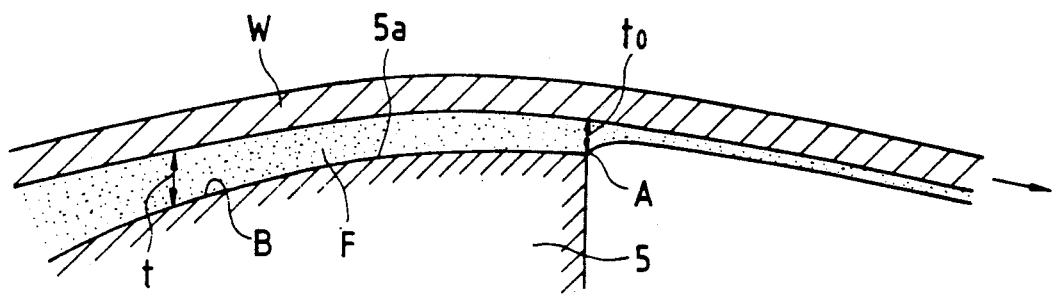
FIG. 6 illustrate the state of application with a conventional application device.

However, increasing the value $t_0$ of the clearance t at the downstream end A, as shown in FIG. 5, is likely to cause a problem in that the pressure of the liquid F is decreased at the downstream end too much to keep the surface of the liquid stable. As a result, surface waves tend to occur at the downstream end, causing transverse streaks to be formed. In other words, there is an appropriate range in which the value $t_0$ of the clearance 5 at the downstream end A should be set.

As a result of intensive studies and experiments, the inventor has found that the support roller 21 should be disposed so that the angle $\theta$ between the tangent to the surface 5a of the doctor edge portion 5 at the downstream end A thereof and the part of the carrier W which moves away from the downstream end is in a range of 0.5 degree to 10 degrees. Streaks can thus be prevented from being formed on the layer of the liquid F applied to the carrier W, thus stabilizing and improving the S/N ratio, the C/N ratio and the like of the manufactured magnetic recording medium.

The clearance between the surface 5a of the doctor edge portion 5 and the surface of the carrier W along the entire width of the portion is usually determined in terms of set conditions such as the tension of the carrier and the feed flow rate of the liquid F, and can be very easily and accurately set at a desired value in accordance with the thickness of the layer of applied liquid by, in particular, adjusting the set flow rate of the liquid.

If the doctor edge portion 5 and the back edge portion 6 are made of a very hard alloy or a ceramic, the angularity and flatness of those portions can be made high.

The constitution of the application head 20 and the manner of feeding the liquid F to the pocket 3 are not confined to those illustrated in FIG. 3, but may be variously modified. For example, the head 20 may be constituted to simultaneously apply two liquids in two layers to a carrier. The pocket 3 may not be cylindrically shaped as in the embodiment, but shaped angularly or shaped like the hull of a ship. What is required as to the form of the pocket 3 is that the distribution of the pressure of the liquid F be uniform along the entire length of the pocket.

Although the above-described application head 20 is of the extrusion type, the present invention is not confined thereto, and it may be embodied in various other types of application head.

In an application method and an application device which are provided in accordance with the present invention, the clearance between the surface of a doctor edge portion and the surface of a flexible carrier is made larger at the downstream end of the surface so that the shearing stress of the applied liquid at the downstream end is decreased. As a result, deterioration of the surface of the doctor edge portion resulting from corrosion or wear of the downstream end of the surface is retarded so that maintenance work such as replacing the doctor edge portion or reprocessing the surface or the like does not need to be performed often. For that reason, even if application is performed continuously for a long time, streaking is prevented from occurring in the layer of the applied liquid. For example, the S/N ratio, the C/N ratio or the like of a magnetic recording material manufactured using the application head of the invention can thus be maintained at a good level for long periods of time.

The effects of the present invention are hereafter clarified by describing actual examples of the invention.

Substances shown in Table 1 below were put in a ball mill and then sufficiently mixed and dispersed together for ten and a half hours. Thirty parts by weight of an epoxy resin of 400 epoxy equivalent were added to the mixture, and then uniformly mixed and dispersed together therewith so that a magnetic liquid was prepared.

TABLE 1

| | |
|---|---|
| γ-FE$_2$O$_3$ powder (spicular grains of 0.5 μm in mean diameter and 320 Oe in coercive force) | 300 parts by weight |
| Copolymer of vinyl chloride and vinyl acetate (87:13 in copolymerization and 400 in polymerization degree) | 30 parts by weight |
| Electroconductive carbon | 20 parts by weight |
| Polyamide resin (300 in amine value) | 15 parts by weight |
| Lecithin | 6 parts by weight |
| Stearic acid | X parts by weight |
| Xylol | Y parts by weight |
| Methylisobutyl ketone | 300 parts by weight |
| n-butanol | 100 parts by weight |

When the equilibrium viscosity of the magnetic liquid was measured with a Shimadzu rheometer model RM-1 manufactured by Shimadzu Corp., the reading to the rheometer was 5 to 25 cps for 400 to 120 parts by weight of xylol at a shearing velocity of $10^4$ per second. The amount X of the stearic acid was 2 to 30 parts by weight.

The magnetic liquid was applied to a carrier using an application device 1 constructed described above. The carrier was a polyethylene terephthalate film 15 μm thick, 100 mm in width and 25 kg-w/m, and was moved at speeds of 300 m/min, 400 m/min, 500 m/min and 600 m/min. The application head 20 of the device had a radius of curvature of the upstream part of the surface 5a of the doctor edge portion 5 of 1.5 mm, the width $l_1$ of the doctor edge portion was 0.6 mm, the width $l_2$ of the slot 4 was 0.7 mm, the difference h in height between the surfaces 5a and 6a of the doctor and the back edge portions 5 and 6 was 0.07 mm, the width $l_3$ of the back edge portion was 6.0 mm, and angle θ of the surface of the back edge portion related to a horizontal plane was 30 degrees. To change the angle θ between the tangent to the surface 5a of the doctor edge portion 5 at the downstream end A of the doctor edge portion 5 and the part of the carrier which moves away from the downstream end, the support roller 21 provided immediately downstream of the application head 20 was displaced. The thickness of the film of the magnetic liquid applied to the carrier was 40 to 45 cc/m$^2$.

Application of the liquid was continuously performed while the carrier was moved through a length of 100,000 m. The surface of the applied magnetic liquid on the last part of the carrier was observed to check whether streaks were formed on the surface due to corrosion or wear as the angle θ was changed to −5 degrees, 0 degrees, 0.5 degree, 1 degree, 5 degrees, 10 degrees and 15 degrees. The results of this observation are shown in Table 2 below. The symbol O in Table 2 means that the application was good, Δ means that the application was good at some times but not good at other times, and X means that the application was poor because a large number of streaks were formed. When the angle θ was 0 to 5 degrees, the streaks were longitudinal ones formed due to deterioration of the surface of the doctor edge portion resulting from corrosion or wear of the surface. When the angle θ was 15 degrees or more, the streaks were transverse ones believed to be made due to a waving phenomena which occurred as the carrier moved away from the application head.

TABLE 2

| Application Speed | Angle θ | | | | | | |
|---|---|---|---|---|---|---|---|
| | −5° | 0° | 0.5° | 1° | 5° | 10° | 15° |
| 300 m/min | X | Δ | O | O | O | O | O |
| 400 m/min | X | X | O | O | O | O | Δ |
| 500 m/min | X | X | Δ | O | O | O | X |
| 600 m/min | X | X | Δ | O | O | O | X |

It is understood from Table 2 that when the angle θ was 0.5 to 10 degrees, application could be continued in a good state for a long time without the occurrence of streaking, even if the speed of application was very high.

What is claimed is:

1. In a method of continuously applying a liquid to the surface of a continuously moving flexible carrier through the use of a curved surface of a doctor edge portion of an application head facing the surface of said carrier and along which said applied liquid flows, the improvement wherein the thickness of a coated film is controlled by changing the relative positional relationship between said curved surface and said carrier and wherein a clearance between the surface of said carrier and said curved surface of said doctor edge portion is larger at a downstream end of said surface of said doctor edge portion than at an upstream part of said surface of said doctor edge portion.

2. The method of claim 1, wherein an angle between a tangent to said curved surface of said doctor edge portion at said downstream end of said curved surface of said doctor edge portion and a portion of said surface of said carrier moving away from said downstream end is in a range of 0.5 degrees to 10 degrees.

3. In a device for continuously applying a liquid to the surface of a continuously moving flexible carrier through the use of a curved surface of a doctor edge portion of an application head facing the surface of said carrier and along which the applied liquid flows, the improvement comprising a support roller for said carrier provided near a downstream end of said curved surface of said doctor portion, said support roller being positioned so that a clearance between said surface of said carrier and said curved surface of said doctor edge portion can be controlled by said roller along substantially the entire width of said doctor edge portion by displacing said roller, wherein application of said liquid to said carrier is performed while said clearance between said surface of said carrier and said curved surface of said doctor edge portion is larger at a downstream end of said curved surface of said doctor edge portion that at an upstream part of said curved surface of said doctor edge portion and wherein the thickness of a coated film is controlled by changing the relative positioned relationship between said curved surface and said carrier.

4. The device according to the claim 3, wherein said application device is an extrusion-type application device for applying said liquid to said surface of said continuously moving flexible carrier by discharging said liquid from an outlet portion of a slot, and wherein said curved surface of said doctor edge portion is curved convexly toward said carrier.

5. The device according to claim 4, wherein an angle between a tangent to said curved surface of said doctor edge portion at said downstream end of said surface of said doctor edge portion and a portion of said surface of said carrier moving away from said downstream end is in a range of 0.5 degrees to 10 degrees.

* * * * *